(12) United States Patent
Razavi et al.

(10) Patent No.: US 6,380,311 B1
(45) Date of Patent: Apr. 30, 2002

(54) PROCESS TO PRODUCE BIMODAL POLYOLEFINS WITH METALLOCENE CATALYSTS USING TWO REACTION ZONES

(75) Inventors: Abbas Razavi, Mons; Guy Debras, Frasnes Lez Gosselies, both of (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/424,430

(22) PCT Filed: May 26, 1998

(86) PCT No.: PCT/EP98/03100

§ 371 Date: Feb. 7, 2000

§ 102(e) Date: Feb. 7, 2000

(87) PCT Pub. No.: WO98/54232

PCT Pub. Date: Dec. 3, 1998

(30) Foreign Application Priority Data

May 26, 1997 (EP) .............................. 97108490

(51) Int. Cl.⁷ ........................... C08L 23/00; C08L 23/04
(52) U.S. Cl. ........................................ 525/191; 525/240
(58) Field of Search .................................. 525/191, 240

(56) References Cited

U.S. PATENT DOCUMENTS 5,539,076 A * 7/1996 Nowlin et al. ............ 526/348.1
5,882,750 A * 3/1999 Mink et al. ................ 428/35.7

FOREIGN PATENT DOCUMENTS

| EP | 0447035 | 9/1991 |
| EP | 0571987 | 12/1993 |
| EP | 0605952 | 7/1994 |
| EP | 0770629 | 5/1997 |
| WO | 9215619 | 9/1992 |

* cited by examiner

*Primary Examiner*—Nathan M. Nutter
(74) *Attorney, Agent, or Firm*—Gilbreth & Associates

(57) ABSTRACT

A process for the preparation of polyolefins having a bi- or multimodal molecular weight distribution, the process comprising the steps of: (i) contacting an olefin monomer and a first co-reactant with a catalyst system in a first reaction zone under first polymerization conditions to produce a product comprising a first polyolefin having a first molecular weight distribution; and (ii) contacting an olefin monomer and a second co-reactant with a catalyst system in a second reaction zone under second polymerization conditions to produce a product comprising a second polyolefin having a second molecular weight distribution different from the first molecular weight distribution; wherein the first and second polyolefins are mixed together, wherein one of the co-reactants is hydrogen and the other is a comonomer selected from butene, methylpentene, hexene or octene, and wherein each catalyst system comprises (a) a metallocene catalyst component comprising a bis tetrahydroindenly compound of the general formula $(IndH_4)_2R''MQ_2$ in which each Ind is the same or different and is indenyl or substituted indenyl, R" is a bridge which comprises a C1–C4 alkylene radical, a dialkly mernamium or silicon or siloxane, or an alkyl phosphine or amine radical, which bridge is substitued or unsubstituted, M is a Group IV metal or vanadium and each Q is hydrocarbyl having 1 to 20 carbon atoms or halogen; and (b) a cocatalyst which activates the catalyst component.

11 Claims, 5 Drawing Sheets

PROCESS TO PRODUCE BIMODAL POLYOLEFINS WITH METALLOCENE CATALYSTS USING TWO REACTION ZONES

CROSS-REFERENCES TO RELATED APPLICATIONS:

The present application claims foreign priority benefits under 35 U.S.C. § 119 to International Application Number PCT/EP98/03100, entitled "Process to Produce Bimodal Polyolefins with Metallocene Catalysts Using Two Reaction Zones", which has an International Filing Date of May 26, 1998, and which claims priority to EPO Application 97108490.0, filed May 26, 1997.

STATEMENT REGARDING FEDERALLY SPONSORED RESEARCH OR DEVELOPMENT:

Not Applicable

BACKGROUND OF THE INVENTION.

1. FIELD OF THE INVENTION.

The present invention relates to a process for the preparation of polyolefins, especially polyethylenes, having a multimodal molecular weight distribution, more particularly a bimodal molecular weight distribution.

2. DESCRIPTION OF RELATED ART.

Polyolefins such as polyethylene which have high molecular weight generally have improved mechanical properties over their lower molecular weight counterparts. However, high molecular weight polyolefins can be difficult to process and can be costly to produce. Polyolefins having a bimodal molecular weight distribution are desirable because they can combine the advantageous mechanical properties of high molecular weight fraction with the improved processing properties of the low molecular weight fraction.

For many HDPE applications, polyethylene with enhanced toughness, strength and environmental stress craking resistance (ESCR) is important. These enhanced properties are more readily attainable with high molecular weight polyethylene. However, as the molecular weight of the polymer increases, the processibility of the resin decreases. By providing a polymer with a broad or bimodal MWD, the desired properties that are characteristic of high molecular weight resin are retained while processability, particularly extrudibility, is improved.

There are several methods for the production of bimodal or broad molecular weight distribution resins: melt blending, reactor in series configuration, or single reactor with dual site catalysts. Melt blending suffers from the disadvantages brought on by the requirement of complete homogenization and high cost. Use of a dual catalyst for the production of a bimodal resin in a single reactor is also known.

Chromium catalysts for use in polyolefin production tend to broaden the molecular weight distribution and can in some cases produce bimodal molecular weight distribution but usually the low molecular part of these resins contains a substantial amount of the comonomer. Whilst a broadened molecular weight distribution provides acceptable processing properties, a bimodal molecular weight distribution can provide excellent properties. In some cases it is even possible to regulate the amount of high and low molecular weight fraction and thereby regulate the mechanical properties. It is difficult to make bimodal polyethylene, for example, with a single catalyst because two separate sets of reaction conditions are needed. Frequently, two reactors are linked in series. However, this can give rise to processing problems. Where loop reactors are used, they are typically linked by a conduit which limits the throughput of material through the reactor system. This can result in an expensive product.

Ziegler Natta catalysts are known to be capable of producing bimodal polyethylene using two reactors in series. Typically, in a first reactor, a low molecular weight homopolymer is formed by reaction between hydrogen and ethylene in the presence of the Ziegler Natta catalyst. It is essential that excess hydrogen be used in this process and, as a result, it is necessary to remove all the hydrogen from the first reactor before the products are passed to the second reactor.

In the second reactor, a copolymer of ethylene and hexene is made so as to produce a high molecular weight polyethylene. Metallocene catalysts are also known in the production of polyolefins. For example, EP-A-0619325 describes a process for preparing polyolefins such as polyethylenes having a multimodal or at least bimodal molecular weight distribution. In this process, a catalyst system which includes at least two metallocenes is employed. The metallocenes used are, for example, a bis(cyclopentadienyl) zirconium dichloride and an ethylene-bis(indenyl) zirconium dichloride. By using the two different metallocene catalysts in the same reactor, a molecular weight distribution is obtained which is at least bimodal.

EP-A-0770629 relates to a process for producing an in situ polyethylene blend, the examples of which use a bis (cyclopentadienyl) zirconium ethyl chloride or indendyl zirconium tris(pivalate) catalyst. Truly bi- or multimodal polyolefin products are not obtained.

BRIEF SUMMARY OF THE INVENTION.

The present invention provides a process for the preparation of polyolefins having a bi- or multimodal molecular weight distribution which comprises:

EP-A-0605952 discloses an ethylene/alpha-olefin copolymer composition obtained from a multi-stage olefin polymerisation process involving a plurality of metallocene compounds.

The present invention aims to overcome the disadvantages of the prior art.

The present invention provides a process for the preparation of polyolefins having a bi- or multimodal molecular weight distribution which comprises:

Figure 1:
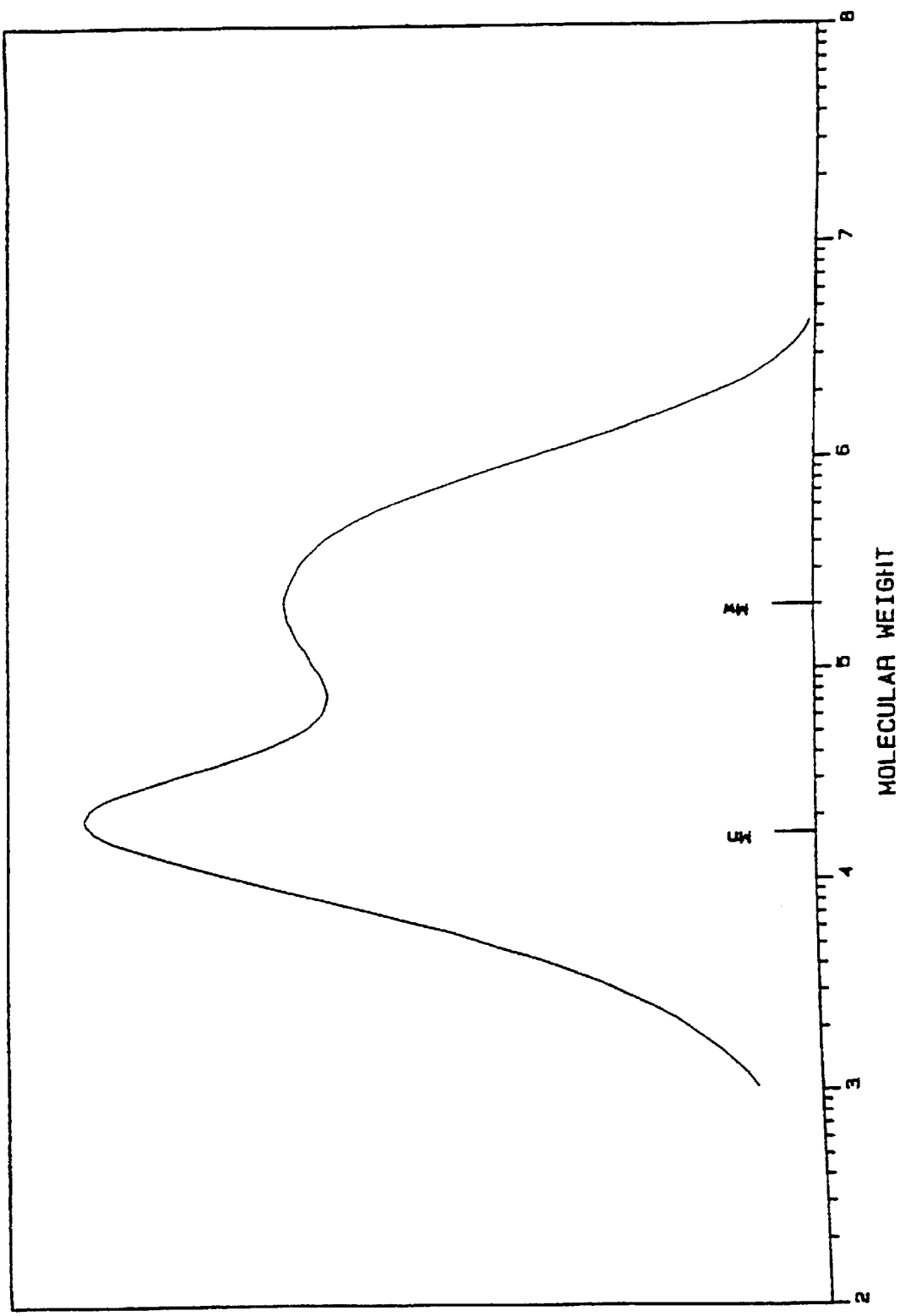
FIG. 1 shows a gel permeation chromatograph of a bimodal polyethylene produced by extrusion blending in accordance with Example 2.

DETAILED DESCRIPTION OF THE INVENTION.

Because the metallocene catalyst component is capable of operation at relatively low concentrations of at least the first co-reactant, the process can be performed under conditions where substantially all of the first co-reactant is consumed in the first reaction zone. This is especially so where the product of step (i) is contacted with the second co-reactant in step (ii). This makes the process more efficient and more economical to operate. The costly need to ensure that excess quantities of the first co-reactant are removed may be avoided.

Because the metallocene catalyst component is capable of operating at relatively low concentrations of at least the first co-reactant, the process can be performed under conditions whereby substantially all of the first co-reactant is consumed in the first reaction zone. This is especially so where the product of step (i) is contacted with the second co-reactant in step (ii). This makes the process more efficient and more economical to operate. The costly need to ensure that excess quantities of the first co-reactant are removed may be avoided.

The use of multiple reactors is a preferred aspect of the present invention. This will require a higher investment than for a single reactor system but is very conveniently clone with the catalyst systems disclosed in the present invention. With the present catalyst system, using two reactors in series conditions can be provided for the best resin properties. It has been shown that the combination of low branching (ideally no branching) in the low molecular part of the resin and high concentration of branching in the high molecular part significantly improves the resin properties with respect to ESCR and impact strength. According to this invention, the interconnected reactors operate in liquid full conditions. The configuration can be two or more loop reactors connected in series or one or more loop reactor(s) connected with one or more continuously stirred (CSTR) liquid full reactors.

Each bis tetrahydroindenyl compound may be substituted in the same way or differently from one another at one or more positions in the cyclopentadienyl ring, the cyclohexenyl ring and the ethylene bridge. Each substituent group may be independently chosen from those of formula XRv, in which X is chosen from group IVA, oxygen and nitrogen and each R is the same of different and chosen from hydrogen or hydrocarbyl of from 1 to 20 carbon atoms and v+1 is the valence of X. X is preferably C. If the cyclopentadienyl ring is substituted, its substituent groupe must not be so bulky as to affect coordination of the olefin monomer to the metal M. Substituents on the cyclopentadienyl ring preferably have R as hydrogen or CH3. More preferably, at least one and most preferably both cyclopentadienyl rings are unsubstituted.

In a particularly preferred embodiment, both indenyls are unsubstituted. R" is preferably an ethylene bridge which is substituted or unsubstituted.

The metal M is preferably zirconium, hafnium or titanium, most preferably zirconium. Each Q is the same or different and may be a hydrocarbyl or hydrocarboxy radical having 1–20 carbon atoms or a halogen. Suitable hydrocarbyls include aryl, alkyl, alkenyl, alkylaryl or aryl alkyl. Each Q is preferably halogen. Ethylene bis(4,5,6,7-tetrahydro-1-indenyl) zirconium dichloride is a particularly preferred bis tetrahydroindenyl compound of the present invention.

The metallocene catalyst component used in the present invention can be prepared by any known method. A preferred preparation method is described in J. Organomet. Chem. 288, 63–67 (1985).

The cocatalyst which activates the metallocene catalyst component can be any cocatalyst known for this purpose such as an aluminium-containing cocatalyst or a boron-containing cocatalyst. The aluminium-containing coctalyst may comprise an alumoxane, an alkyl aluminium and/or a Lewis acid.

The alumoxanes used in the process of the present invention are well known and preferably comprise oligomeric linear and/or cyclic alkyl alumoxanes represented by the formula:

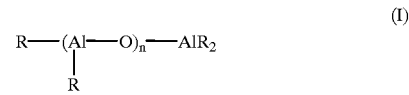

(I)

for oligomeric, linear alumoxanes and

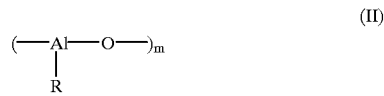

(II)

for oligomeric, cyclic alumoxane, wherein n is 1–40, preferably 10–20, m is 3–40, preferably 3–20 and R is a $C_1$–$C_8$ alkyl group and preferably methyl.

Generally, in the preparation of alumoxanes from, for example, aluminium trimethyl and water, a mixture of linear and cyclic compounds is obtained.

Suitable boron-containing cocatalysts may comprise a triphenylcarbenium boronate such as tetrakis-pentafluorophenyl-borato-triphenylcarbenium as described in EP-A-0427696, or those of the general formula [L'-H]+[B $Ar_1$ $Ar_2$ $X_3$ $X_4$]- as described in EP-A-0277004 (page 6, line 30 to page 7, line 7).

Preferably, the same catalyst system is used in both steps (i) and (ii) of the process. The catalyst system may be employed in a solution polymerisation process, which is homogeneous, or a slurry process, which is heterogeneous. In a solution process, typical solvents include hydrocarbons with 4 to 7 carbon atoms such as heptane, toluene or cyclohexane. In a slurry process it is necessary to immobilise the catalyst system on an inert support, particularly a porous solid support such as talc, inorganic oxides and resinous support materials such as polyolefin. Preferably, the support material is an inorganic oxide in its finally divided form.

Suitable inorganic oxide materials which are desirably employed in accordance with this invention include Group 2a, 3a, 4a or 4b metal oxides such as silica, alumina and mixtures thereof. Other inorganic oxides that may be employed either alone or in combination with the silica, or alumin a are magnesia, titania, zirconia, and the like. other suitable support materials, however, can be employed, for example, finely divided functionalized polyolefins such as finely divided polyethylene.

Preferably, the support is a silica having a surface area comprised between 200 and 700 m2/g and a pore volume comprised between 0.5 and 3 ml/g.

The amount of alumoxane and metallocenes usefully employed in the preparation of the solid support catalyst can vary over a wide range. Preferably the aluminium to transition metal mole ratio is in the range between 1:1 and 100:1, preferably in the range 5:1 and 50:1.

The order of addition of the metallocenes and alumoxane to the support material can vary. In accordance with a preferred embodiment of the present invention alumoxane dissolved in a suitable inert hydrocarbon solvent is added to the support material slurried in the same or other suitable hydrocarbon liquid and thereafter a mixture of the metallocene catalyst component is added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane and cyclohexane; and aromatics such as benzene, toluene, ethylbenzene and diethylbenzene.

Preferably the support material is slurried in toluene and the metallocene and alumoxane are dissolved in toluene prior to addition to the support material.

In one arrangement according to the present invention, each polyolefin is produced individually in a reactor, preferably a loop reactor, and mixed together by extrusion. The polyolefins may be mixed together by melt blending. In this way, the low molecular weight and high molecular weight parts of the polyolefin can be produced in separate reactors.

In a preferred arrangement, the product of step (i), including the olefin monomer, is contacted with the second co-reactant and the catalyst system in step (ii) to produce and mix the second polyolefin with the first polyolefin in the second reaction zone. The first and second reaction zones are conveniently interconnected reactors such as interconnected loop reactors or interconnected loop and continuously stirred reactors. It is also possible to introduce into the second reaction zone fresh olefin monomer as well as the product of step (i).

Because the second polyolefin is produced in the presence of the first polyolefin a multimodal or at least bimodal molecular weight distribution is obtained. In one embodiment of the invention, the first co-reactant is hydrogen and the second co-reactant is the comonomer. Typical comonomers include hexene, butene, octene or methylpentene, preferably hexene. Preferably, hydrogen is supplied to the first reaction zone at a rate of no more than 30 NL/h, preferably at a rate in the range 2.5 NL/h to 10 NL/h. In this way, substantially all the hydrogen is consumed in the first reaction zone before step (ii). This is a convenient way of producing a polyolefin, preferably polyethylene, having a bimodal molecular weight distribution whereby relatively low molecular weight homopolymer is produced in the first reaction zone and higher molecular weight copolymer is produced in the second reaction zone. Because substantially all of the hydrogen is consumed in the first reaction zone there is little or no interference with the copolymerisation in the second reaction zone.

In an alternative embodiment, the first co-reactant is the comonomer, preferably hexene. The comonomer is preferably supplied to its reaction zone at a rate of no more than 1200 cc/h, more preferably in the range 250 to 750 cc/h. Because the metallocene catalyst components of the present invention exhibit good comonomer response as well as good hydrogen response, substantially all of the comonomer is consumed in the first reaction zone in this embodiment. Homopolymerisation takes place in the second reaction zone with little or no interference from the comonomer.

The temperature of each reactor may be in the range of from 60° C to 110° C., preferably from 70° C. to 100° C.

The HLMI of the polyolefin resins made in accordance with the present invention typically falls in the range 0.1 to 45,000 g/10', preferably in the range 0.4 to 45,000 g/10'. The density of the resins is typically in the range 0.9 to 9.7 g/ml, preferably 0.92 to 0.97 g/ml.

Figure 2:
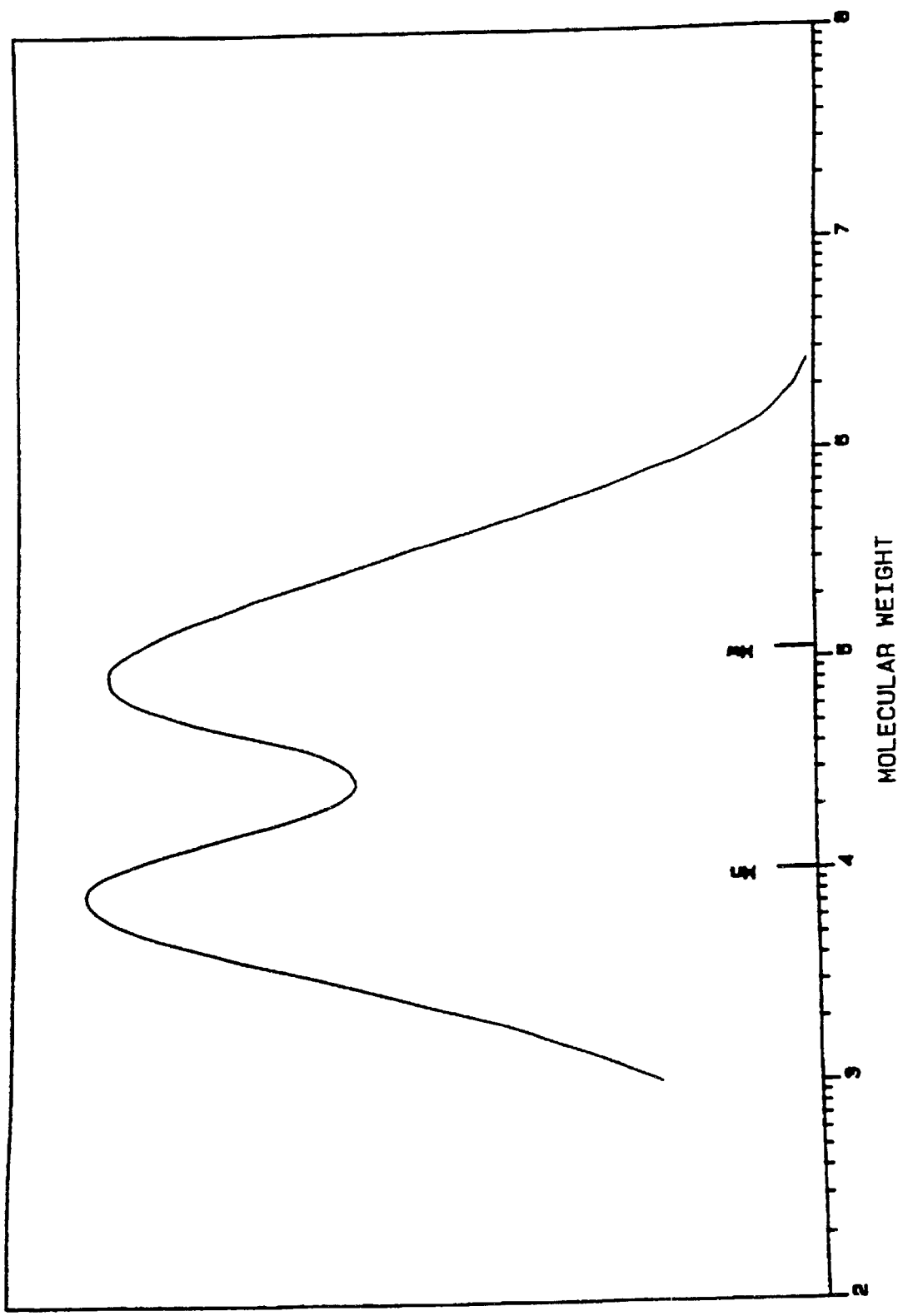
FIG. 2 shows a gel permeation chromatograph of a bimodal polyethylene produced in a loop/CSTR reactor configuration in accordance with Example 3.
Figure 3:
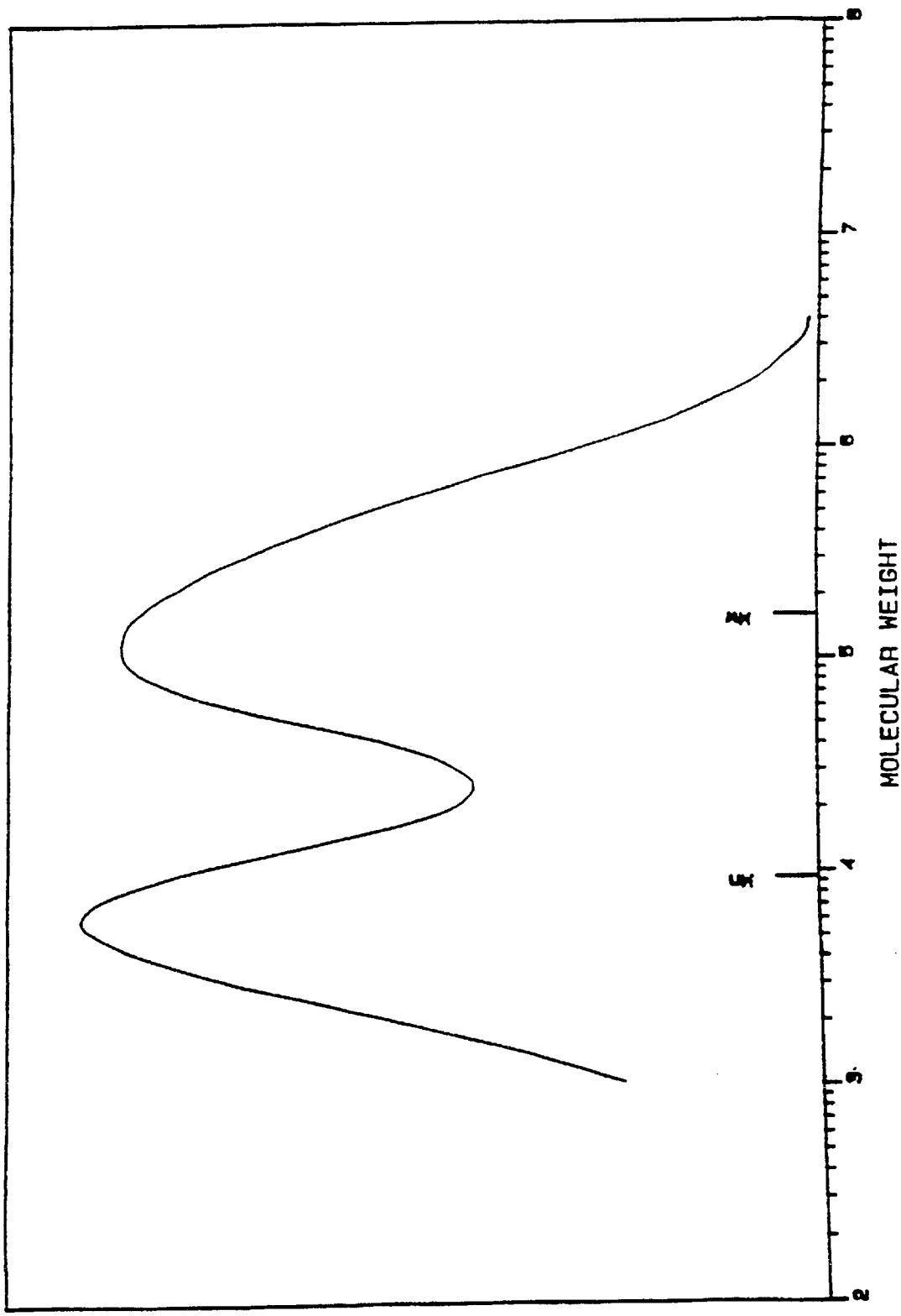
FIG. 3 shows a gel permeation chromatograph of a bimodal polyethylene produced in a loop/CSTR reactor configuration in accordance with Example 3.
Figure 4:
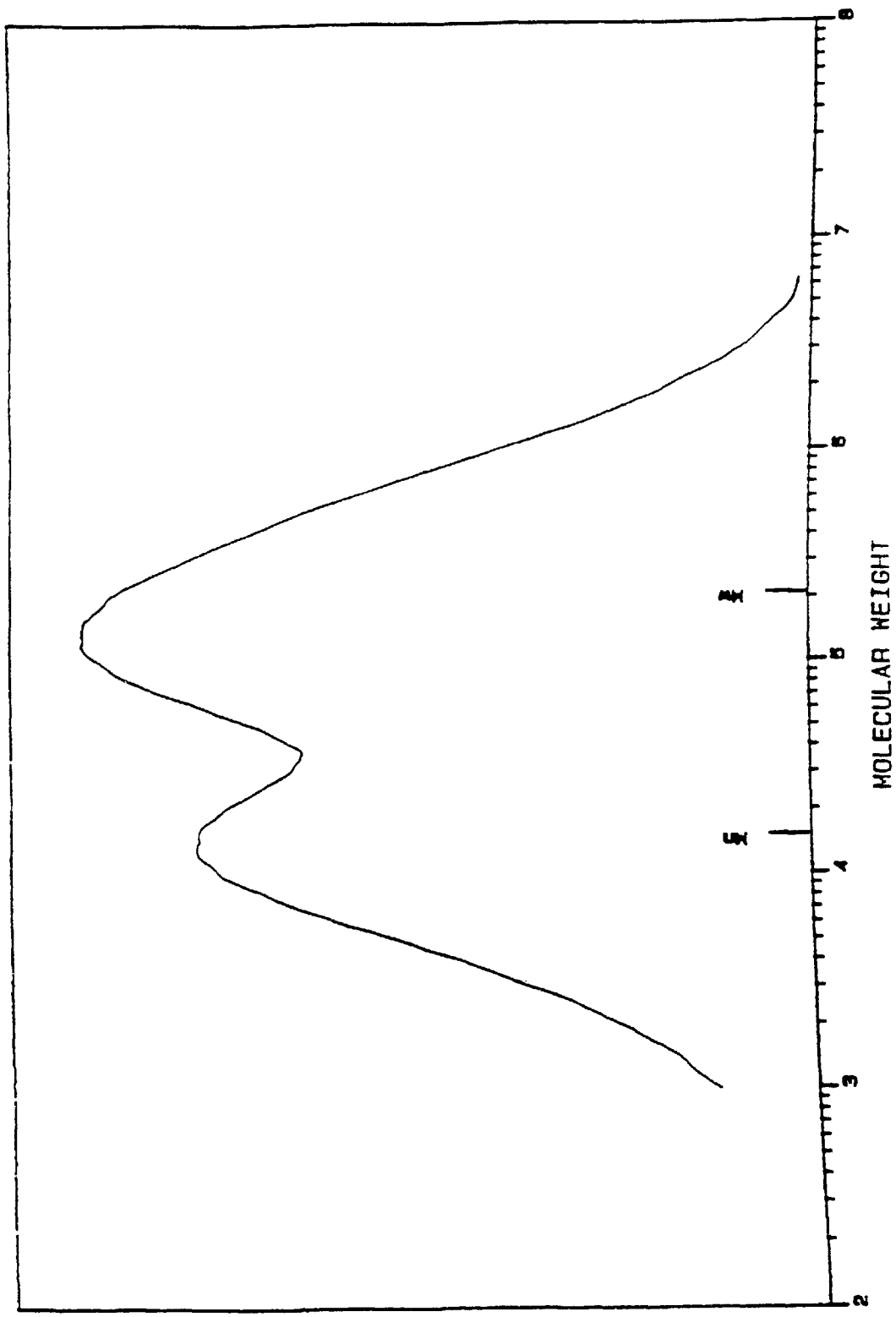
FIG. 4 shows a gel permeation chromatograph of a bimodal polyethylene produced in a loop/CSTR reactor configuration in accordance with Example 4.
Figure 5:
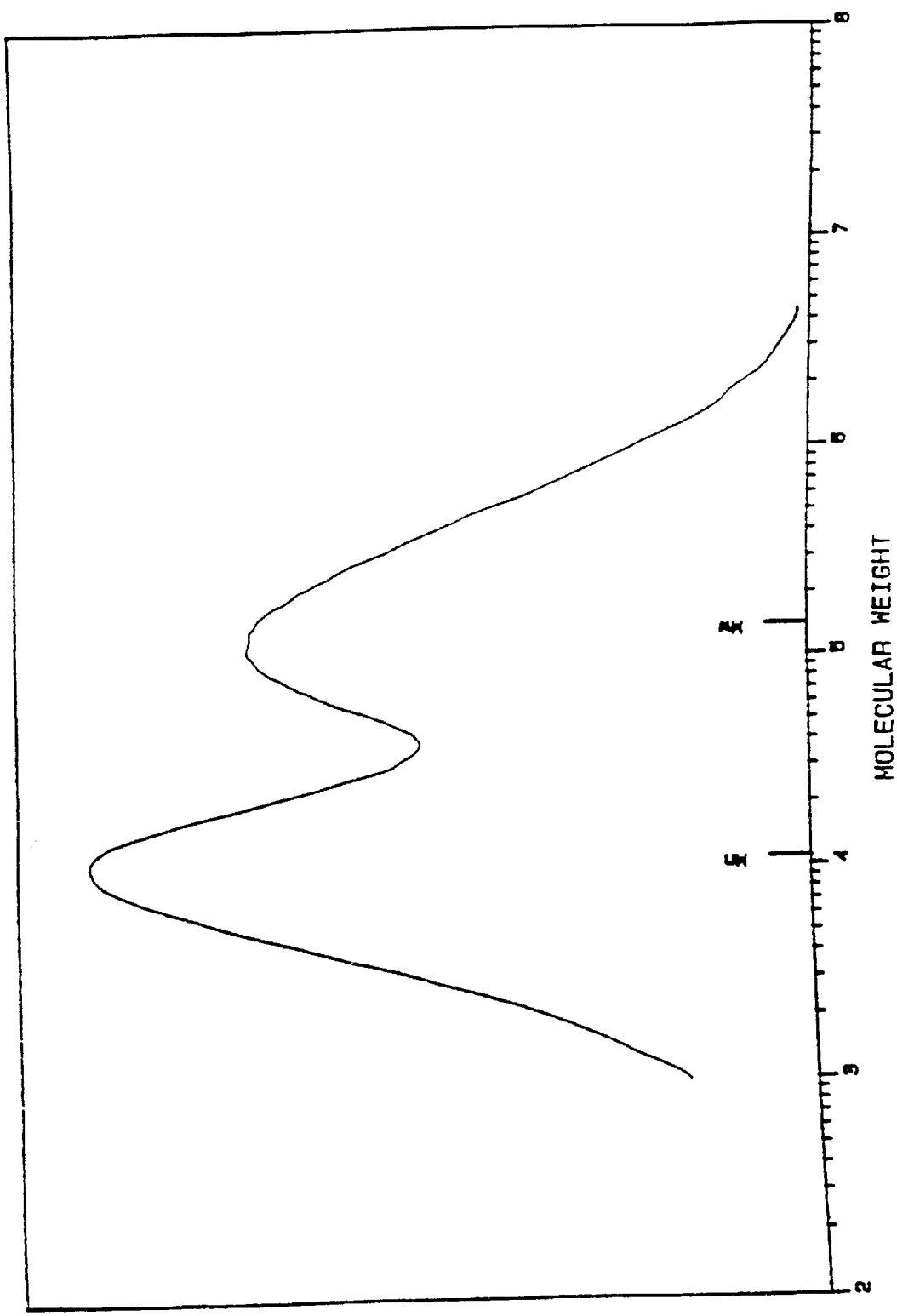
FIG. 5 shows a gel permeation chromatograph of a bimodal polyethylene produced in a loop/CSTR reactor configuration in accordance with Example 4.

The invention will now be described in further detail, by way of example only, with reference to the following Examples and the attached drawings, in which:

FIG. 1 shows a gel permeation chromatograph of a bimodal polyethylene produced by extrusion blending in accordance with Example 2;

FIG. 2 shows a gel permeation chromatograph of a bimodal polyethylene produced in a loop/CSTR reactor configuration in accordance with Example 3;

FIG. 3 shows a gel permeation chromatograph of a bimodal polyethylene produced in a loop/CSTR reactor configuration in accordance with Example 3;

FIG. 4 shows shows a gel permeation chromatograph of a bimodal polyethylene produced in a loop/CSTR reactor configuration in accordance with Example 4; and FIG. 5 shows shows a gel permeation chromatograph of a bimodal polyethylene produced in a loop/CSTR reactor configuration in accordance with Example 4.

EXAMPLE 1

Catalyst Preparation

Ethylene bis(4,5,6,7-tetrahydro-1-indenyl) zirconium dichloride was prepared in accordance with the method of Brintzinger as published in Journal of Organometallic Chemistry, 288 (1985) pages 63 to 67.

The support used in a silica having a total pore volume of 4.217 ml/g and a surface area of 322 $m^2$/g. This silica is further prepared by drying in high vacuum on a schlenk line for three hours to remove the physically absorbed water. 5 g of this silica are suspended in 50 ml of toluene and placed in a round bottom flask equipped with magnetic stirrer, nitrogen inlet and dropping funnel.

An amount of 0.31 g of the metallocene is reacted with 25 ml of methylalumoxane (MAO 30 wt % in toluene) at a temperature of 25° C. during 10 minutes to give a solution mixture of the corresponding metallocenium cation and the anionic methylalumoxane oligomer.

Then the resulting solution comprising the metallocenium cation and the anionic methylalumoxane oligomer is added to the support under a nitrogen atmosphere via the dropping funnel which is replaced immediately after with a reflux condenser. The mixture is heated to 110° C. for 90 minutes. Then the reaction mixture is cooled down to room temperature, filtered under nitrogen and washed with toluene.

The catalyst obtained is then washed with pentane and dried under a mild vacuum.

EXAMPLE 2

Bimodal Polyethylene Production by Extrusion Blending

The supported metallocene catalyst of Example 1 was used in two separate reactors to produce two polyethylene resins having different molecular weight distributions which were subsequently extrusion blended together to produce a bimodal molecular weight distribution polyethylene. The first reactor was a 70l loop reactor. The second reactor was a 35l CSTR reactor.

The results are summarised in Table 1 below in which entry 1 relates to the first loop reactor in which the copolymerisation of ethylene and hexene took place at the conditions stated using an isobutene diluent. Entry 2 relates to the second CSTR reactor in which homopolymerisation of ethylene took place to give rise to a polyethylene product of lower weight and average molecular weight than that of the first loop reactor. 60 weight % of the product from the first loop reactor and 40 weight % product from the second CSTR reactor were extrusion blended together and the results are shown in entry 3 of Table 1. Gel permeation chromatography of a product produced in accordance with this method gives rise to a molecular weight distribution which is bimodal, as shown in attached FIG. 1. The properties of the polyethylene of FIG. 1 are summarised in Table 4 below.

TABLE 1

| Entry | Temp. (° C.) | H2 (Nl/h) | Ethylene (wt %) off gas | C6/C2 wt ratio | HLMI (g/10 min) | MI2 (g/10 min) | SR | Density (g/ml) |
|---|---|---|---|---|---|---|---|---|
| 1 | 70 | 0 | 5.5 | 0.291 | 0.4 | / | / | 0.923 |
| 2 | 92 | 30 | 3.8 | 0.003 | >45,000 | / | / | >0.970 |
| 3 | | | | | 12.48 | 0.11 | 113.5 | 0.943 |

HLMI = High Load Melt Index (ASTM D1238 at load 21.6 kg and temp 190° C.)
MI2 = Normal Melt Index (ASTM D1238 at load 2.16 kg and temp 190° C.)
SR = Shear resistance HLMI/MI2

EXAMPLE 3

Bimodal Polyethylene Production using Loop/continuously Stirred Reactor Configuration The supported metallocene catalyst of Example 1 was used in the production of a bimodal polyethylene using interconnected loop and continuously stirred (CSTR) reactors in series.

Six runs, A and F were performed. In each run, copolymerisation of ethylene and hexene took place in a 70l loop reactor to form a high molecular weight polyethylene and homopolymerisation of ethylene in the presence of hydrogen took place in a 35l CSTR to produce a low molecular weight polyethylene. The details and results are set out in Table 2. A bimodal polyethylene was produced comprising approximately 60 weight % of a high molecular weight polyethylene from the loop and 40 weight % of the low molecular weight polyethylene from the CSTR. Gel permeation chromatographs of the products from runs A and B are shown respectively in FIGS. 2 and 3. A polyethylene product having a bimodal molecular weight distribution was obtained in both runs. The properties of the polyethylenes of FIGS. 2 and 3 are summarised in Table 4 below.

TABLE 2

| | RUN A | RUN B | RUN C | RUN D | RUN E | RUN F |
|---|---|---|---|---|---|---|
| LOOP | | | | | | |
| Temp (deg C.) | 70 | 70 | 70 | 70 | 69 | 68 |
| H2 (Nl/h) | 0 | 0 | 0 | 0 | 0 | 0 |
| C2- off gas (wt %) | 2.1 | 3.2 | 1.2 | 2.39 | 2.67 | 2.75 |
| C6-/C2- (wt ratio) | 0.233 | 0.247 | 0.375 | 0.259 | 0.217 | 0.211 |
| HLMI (g/10 min) | 3.6 | 0.82 | 10.9 | 1.79 | 1.15 | 0.82 |
| Dens (g/ml) | 0.927 | 0.924 | 0.925 | 0.922 | 0.921 | 0.924 |
| LOOP PART (wt %) | 59 | 59 | / | / | / | / |

TABLE 2-continued

| | RUN A | RUN B | RUN C | RUN D | RUN E | RUN F |
|---|---|---|---|---|---|---|
| CSTR | | | | | | |
| Temp (deg c.) | 90 | 90 | 90 | 90 | 90 | 90 |
| H2 (Nl/h) | 10 | 10 | 5 | 4 | 3 | 2.5 |
| C6- (cc/h) | 0 | 0 | 0 | 0 | 0 | 0 |
| C2- off gas (wt %) | 4.9 | 6.3 | 2.7 | 4.5 | 4.21 | 4.69 |
| Fluff recovery | | | | | | |
| HLMI (g/10 min) | 62 | 17.3 | 100 | 43.8 | 28.2 | 17.7 |
| MI2 (g/10 min) | 0.73 | 0.18 | 1.45 | 0.53 | 0.34 | 0.22 |
| SR | 85 | 96 | 69 | 83 | 83 | 80 |
| Dens (g/ml) | 0.947 | 0.945 | 0.941 | 0.942 | 0.941 | 0.941 |
| Run weight (kg) | 73 | 58 | / | / | / | / |

EXAMPLE 4

Bimodal Polyethylene Production using Loop/continuously Stirred Reactor Configuration In this Example, in contrast to Example 3, the low molecular weight part of the bimodal polyethylene is produced in a loop reactor and the high molecular weight part in a continuously stirred reactor. In accordance with this Example, the supported metallocene catalyst of Example 1 was used under the conditions set out in Table 3 for six runs A to F. In the loop reactor, homopolymerisation of ethylene took place in the presence of hydrogen. In the CSTR, copolymerisation of ethylene with hexene took place. The details and results are set out in Table 3 for runs A to F. In addition, FIGS. 4 and 5 show respectively gel permeation chromatographs of the polyethylene product of runs A and B, from which it can be seen that the products are both bimodal. The properties of the polyethylenes of FIGS. 4 and 5 are summarised in Table 4 below.

TABLE 3

| | RUN A | RUN B | RUN C | RUN D | RUN E | RUN F |
|---|---|---|---|---|---|---|
| LOOP | | | | | | |
| Temp (deg C.) | 92.5 | 90 | 90 | 100 | 100 | 100 |
| H2 (Nl/h) | 10 | 10 | 5 | 2.5 | 2.5 | 2.5 |
| C6- (cc/h) | 0 | 0 | 0 | 0 | 0 | 0 |
| C2- off gas (wt %) | 2.17 | 1.55 | 1.3 | 1.64 | 1.41 | 1.53 |
| HLMI (g/10 min) | >10000 | >7000 | >7000 | 44 | 53 | 50 |
| Dens (g/ml) | >0.970 | >0.970 | 0.972 | / | / | / |
| LOOP PART (wt %) | 50 | 45 | 45 | 46 | 43 | 47 |

TABLE 3-continued

|  | RUN A | RUN B | RUN C | RUN D | RUN E | RUN F |
|---|---|---|---|---|---|---|
| CSTR |  |  |  |  |  |  |
| Temp (deg c.) | 70 | 70 | 70 | 75 | 75 | 75 |
| H2 (Nl/h) | 0 | 0 | 0 | 0 | 0 | 0 |
| C6– (cc/h) | 550 | 645 | 611 | 721 | 774 | 1938 |
| C2– off gas (wt %) | 6.85 | 6.2 | 6.1 | 7.8 | 7.4 | 6.7 |
| C6–/C2– (wt ratio) | 0.115 | 0.134 | 0.152 | 0.15 | 0.15 | 0.47 |
| Fluff recovery |  |  |  |  |  |  |
| HLMI (g/10 min) | 117 | 42 | 31 | 12.1 | 18.4 | 18.8 |
| MI2 (g/10 min) | 1.15 | 0.45 | 0.38 | 0.18 | 0.27 | 0.28 |
| SR | 102 | 93 | 82 | 66 | 69 | 68 |
| Dens (g/ml) | 0.955 | 0.95 | 0.944 | 0.946 | 0.945 | 0.938 |
| Run weight (kg) | 17 | 19 | 15 | / | / | / |

TABLE 4

Polymerisation with ethylene bis(4,5,6,7-tetrahydro-1-indenyl) zirconium dichloride

| FIG. | Mn (Da) | Mw (Da) | Mz (Da) | D | Mp (Da) | D' | A |
|---|---|---|---|---|---|---|---|
| 1 | 16347 | 199765 | 887382 | 12.2 | 19616 | 4.4 | 3338 |
| 2 | 9907 | 111263 | 492997 | 11.2 | 8104 | 4.4 | 3134 |
| 3 | 9256 | 159974 | 746438 | 17.3 | 5984 | 4.7 | 3110 |
| 4 | 14959 | 208992 | 1110470 | 14.0 | 118924 | 5.3 | 9084 |
| 5 | 10753 | 139835 | 801275 | 13.0 | 10654 | 5.7 | 8800 |

Mn = number average molecular weight;
Mw = weight average molecular weight;
D = Mw/Mn;
Mp = peak molecular weight;
D' = Mz/Mw;
A = Area under curve

What is claimed is:

1. A process for the preparation of polyolefins having a bi- or multimodal molecular weight distribution, the process comprising the steps of:

(i) contacting an olefin monomer and a first co-reactant with a catalyst system in a first reaction zone under first polymerization conditions to produce a product comprising a first polyolefin having a first molecular weight distribution; and (ii) contacting an olefin monomer and a second co-reactant with a catalyst system in a second reaction zone under second polymerization conditions to produce a product comprising a second polyolefin having a second molecular weight distribution different from the first molecular weight distribution, wherein the first and second polyolefins are mixed together, wherein one of the co-reactants is hydrogen and the other is a comonomer selected from butene, methylpentene, hexene or octene, and wherein each catalyst system comprises (a) a metallocene catalyst component comprising a bis tetrahydroindenly compound of the general formula $(IndH_4)_2R''MQ_2$ in which each Ind is the same or different and is indenyl or substituted indenyl, R'' is a bridge which comprises a C1–C4 alkylene radical, a dialkly mernamium or silicon or siloxane, or an alkyl phosphine or amine radical, which bridge is substitued or unsubstituted, M is a Group IV metal or vanadium and each Q is hydrocarbyl having 1 to 20 carbon atoms or halogen; and (b) a cocatalyst which activates the catalyst component.

2. A process according to claim 1, wherein R'' is an ethylene bridge, which is substituted or un substituted.

3. A process according to claim 1, wherein the second co-reactant is hydrogen.

4. A process according to claim 1, wherein the comonomer is hexene.

5. A process according to claim 4, wherein the hexene is supplied to its reaction zone at a rate of no more than 1200 $cm^3$/h.

6. A process according to claim 3, wherein hydrogen is supphed to its reaction zone at a rate of no more than 30 NL/h.

7. A process according to claim 1, wherein the temperature of each reaction zone is in the range of from 60° C. to 100° C.

8. A process according to claim 1, wherein the product of step (i), including the olefin monomer, is contacted with the second co-reactant and the catalyst system in step (ii) to produce and mix the second polyolefin with the first polyolefin in the second reaction zone.

9. A process according to claim 8, wherein the first and second reaction zones are interconnected loop reactors.

10. A process according to claim 8, wherein the first and second reaction zones are interconnected loop and continuously stirred reactors.

11. A process according to claim 1 wherein each polyolefin is produced individually in a reactor and mixed together by extrusion.

\* \* \* \* \*